United States Patent Office 2,966,490
Patented Dec. 27, 1960

2,966,490

N-[β-(p-AMINOPHENYL) ETHYL]-4-PHENYL-4-CARBOETHOXYPIPERIDINE SALTS THEREOF AND PROCESSES OF PREPARING THE SAME

John Weijlard and Karl Pfister III, Westfield, N.J., assignors to Merck & Co., Inc., Rahway, N.J., a corporation of New Jersey No Drawing. Filed May 26, 1955, Ser. No. 511,414

4 Claims. (Cl. 260—294.3)

This invention is concerned generally with novel piperidine compounds and with processes for preparing these piperidine derivatives. More particularly, it relates to N - [β - (p - aminophenyl)ethyl] - 4 - phenyl - 4 - carboethoxypiperidine, its monoacyl derivatives, and salts thereof, new compounds which possess superior analgesic activity, and to the process of preparing these new analgesic substances starting with 4-phenyl-4-carboethoxypiperidine.

The N - [β - (p - aminophenyl)ethyl] - 4 - phenyl - 4 - carboethoxypiperidine, its monoacyl derivatives, and salts thereof, subject of the present invention may be chemically represented by the following structural formula:

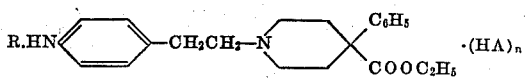

wherein R is hydrogen or an acyl radical, HA is an acid, n equals 1 when R is acyl, and n equals 1 or 2 when R is hydrogen.

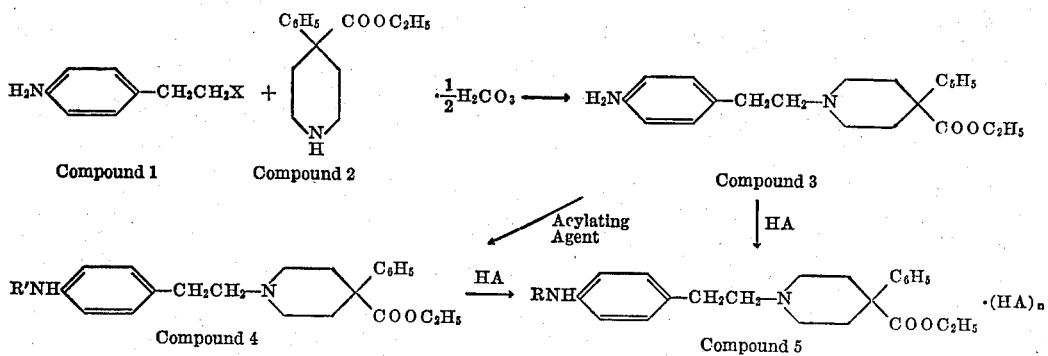

The chemical relationship of N-[β-(p-aminophenyl)-ethyl] - 4 - phenyl - 4 - carboethoxypiperidine to the well-known analgesic, meperidine, is clear from a comparison of the foregoing formula with the structural formula of meperidine which is as follows:

Although meperidine has been widely used as an analgesic, its toxicity has been a disadvantage in many instances. A large number of N-substituted analogues of meperidine have been prepared heretofore in the hope of obtaining a compound having comparable analgesic activity to meperidine and reduced toxicity, but none of the compounds thus prepared have offered a satisfactory substitute for meperidine. There was no reason to expect from this prior work that this line of investigation would lead to an improved analgesic of the meperidine type, since it was found that increasing the molecular size of the N-substituent actually increases the toxicity and reduces the analgesic activity (e.g.

N-benzyl-4-phenyl-4-carboethoxy-piperidine is reported to possess only one-half the analgesic activity of meperidine).

Surprisingly enough, the new compounds, N-[β-(p-aminophenyl)ethyl]-4-phenyl-4-carboethoxypiperidine, its N-acyl derivatives, and salts, have been found to be only one-third as toxic as meperidine and to possess satisfactory analgesic activity at levels at which meperidine possesses no analgesic activity whatsoever; at comparable analgesic activity, the toxicity of N-[β-(p-aminophenyl)ethyl] - 4 - phenyl - 4 - carboethoxypiperidine is less than one-tenth that of meperidine.

Moreover, the medical profession has long desired a general purpose analgesic which could be administered by the oral route. The only analgesics presently known to be effective upon oral administration are codeine and "Dicodid," and neither of these compounds possess the advantages which make meperidine one of the most widely used analgesic substances at this time.

It is therefore a preferred and unobvious embodiment of this invention that N-[β-(p-aminophenyl)ethyl]-4-phenyl-4-carboethoxypiperidine, its acyl derivatives, and salts, are effective upon being administered by the oral route, and that their analgesic activity when so administered is, in fact, equal to their activity when administered parenterally. Thus orally-administered N-[β-(p-aminophenyl)ethyl] - 4 - phenyl - 4 - carboethoxypiperidine possesses comparable analgesic activity to parenterally administered meperidine, even when the former is administered at a dosage level of one-fourth that of the latter.

The N - [β - (p - aminophenyl)ethyl] - 4 - phenyl - 4 - carboethoxypiperidine, its monoacyl derivatives, and salts thereof, can be prepared by reactions which may be chemically represented as follows:

wherein X is halogen, R' is acyl, R is hydrogen or an acyl radical, HA is an acid, n equals 1 when R is acyl, and n equals 1 or 2 when R is hydrogen.

The reactions indicated hereinabove are conducted as follows: 4-phenyl-4-carboethoxy-piperidine carbonate, or other acid salt (Compound 2 hereinabove) is reacted with a β-(p-aminophenyl)ethyl halide (Compound 1) thereby forming N-[β-(p-aminophenyl)ethyl]-4-phenyl-4-carboethoxypiperidine (Compound 3); the latter compound is reacted with an acid to produce the corresponding salt of the N-[β-(p-aminophenyl)ethyl]-4-carboethoxypiperidine (Compound 5 where R is hydrogen); alternatively the N-[β-(p-aminophenyl)ethyl] - 4 - phenyl-4-carboethoxypiperidine is reacted with an acylating agent, preferably a lower alkanoic anhydride, thereby producing the corresponding N-[β-(p-acylaminophenyl)-ethyl] - 4 - phenyl - 4 - carboethoxypiperidine (Compound 4) which is converted by reaction with an acid to the corresponding salt of N-[β-(p-acylaminophenyl)-ethyl]- 4 - phenyl - 4 - carboethoxypiperidine (Compound 5 where R is acyl).

The reaction between the 4-phenyl-4-carboethoxypiperidine carbonate, or other acid salt, and the β-(p-aminophenyl)ethyl halide is conveniently conducted by heating the reactants together in a liquid medium which is substantially inert under the reaction conditions and which is a solvent for the reactants. We ordinarily utilize, as the liquid medium, a lower alkanol such as ethanol, and prefer to conduct the reaction by heating the reactants together in said alkanol solvent under reflux in the presence of an alkali metal bicarbonate such as sodium bicarbonate. As the β-(p-aminophenyl)ethyl halide starting material, we can utilize the chloride, bromide or iodide but we ordinarily prefer to employ an acid salt of either β-(p-aminophenyl)ethyl chloride or β-(p-aminophenyl)ethyl bromide. Utilizing these preferred reactants and under the preferred reaction conditions, the reaction is ordinarily substantially complete in about one to two days. The N-[β-(p-aminophenyl)ethyl]-4-phenyl-4-carboethoxypiperidine thus formed is conveniently recovered from the reaction mixture by removing the inorganic salts by filtration, and evaporating the resulting alcoholic solution to dryness in vacuo. The residual gummy mass is triturated with water, the water is decanted, and the residual material is dried in vacuo to give N-[β - (p - aminophenyl)ethyl] - 4 - phenyl-4-carboethoxypiperidine base.

The N-[β-(p-aminophenyl)ethyl]-4 - phenyl - 4 - carboethoxypiperidine base may then be reacted with an acylating agent as for example benzoic anhydride, a lower alkanoic acid anhydride such as acetic anhydride, propionic anhydride, and the like, thereby monoacylating the primary amino substituent of the N-[β - (p - aminophenyl)ethyl] - 4 - phenyl - 4 - carboethoxypiperidine to form the corresponding N-[β-(p - acylaminophenyl)ethyl] - 4 - phenyl - 4 - carboethoxypiperidine such as N-[β-(p-acetylaminophenyl)ethyl]-4-phenyl-4-carboethoxypiperidine, N - [β - (p - propionyl aminophenyl)ethyl] - 4 - phenyl - 4 - carboethoxypiperidine, N-[β-(p-benzoylaminophenyl)ethyl] - 4 - phenyl-4-carboethoxypiperidine, and the like. The reaction between the acyl anhydride and the N-[β-(p-aminophenyl)ethyl] - 4 - phenyl - 4 - carboethoxypiperidine is ordinarily carried out in solution in an inert solvent under substantially anhydrous conditions. For example, when utilizing a lower alkanoic anhydride such as acetic anhydride, the reaction is conveniently carried out in glacial acetic acid medium. The acylation reaction can be carried out at room temperature or at an elevated temperature of about 100° C. under which conditions the reaction is ordinarily complete in about one hour. The N-[β-(p-acylaminophenyl)ethyl] - 4 - phenyl - 4 - carboethoxypiperidine is conveniently recovered from the reaction mixture by diluting the latter with water and neutralizing the acidic components with sodium carbonate whereupon the acylated product precipitates as a gum which is readily isolated from the aqueous layer by decantation. This gummy material is further purified by washing with water and drying in vacuo.

The conversion of N-[β - (p - aminophenyl)ethyl]-4-phenyl - 4 - carboethoxypiperidine, or its monoacyl derivatives, the N-[β-(p-acylaminophenyl)ethyl]-4-phenyl-4-carboethoxypiperidine, to the corresponding mono and di salts is ordinarily conducted by reacting the N-[β-(p-aminophenyl)ethyl] - 4 - phenyl - 4 - carboethoxypiperidine or the N-[β-(p-acylaminophenyl)ethyl]-4-phenyl-4-carboethoxypiperdine, under substantially anhydrous conditions, with an acid as, for example, hydrogen chloride, hydrogen bromide, sulfuric acid, and the like. This salt-forming reaction is conveniently carried out in a medium comprising a lower alkanol, such as ethanol, methanol, propanol, and the like. Upon diluting the alkanol reaction medium with ether, there precipitates the corresponding salt of the N-[β-(p-aminophenyl)ethyl] - 4 - phenyl - 4 - carboethoxypiperidine, or the salt of N-[β-(p-acylaminophenyl)ethyl] - 4 - phenyl-4-carboethoxypiperidine, such as N-[β-(p-aminophenyl)ethyl] - 4 - phenyl - 4 - carboethoxypiperidine dihydrochloride, N-[β - (p - aminophenyl)ethyl] - 4 - phenyl-4-carboethoxypiperidine sulfate, N-[β - (p - aminophenyl)ethyl] - 4 - phenyl - 4 - carboethoxypiperidine dihydrobromide, N-β-(p-acetylaminophenyl)ethyl] - 4 - phenyl-4-carboethoxypiperidine hydrochloride, N-[β - (p - acetylaminophenyl)ethyl] - 4 - phenyl - 4 - carboethoxypiperidine sulfate, N-[β - (p - propionylaminophenyl)ethyl]-4 phenyl-4-carboethoxypiperidine hydrochloride, N-[β-(p-benzoylaminophenyl)ethyl] - 4 - phenyl - 4 - carboethoxypiperidine hydrochloride, N-[β - (p - acetylaminophenyl)ethyl] - 4 - phenyl - 4 - carboethoxypiperidine hydrobromide, and the like. The salt thus formed is recovered from the alcoholic slurry by filtration or centrifugation.

The following examples illustrate methods of carrying out the present invention, but it is to be understood that these examples are given for purposes of illustration and not of limitation.

*Example 1*

A mixture of 7.8 g. (0.05 mole) of β-(p-aminophenyl)ethyl chloride hydrochloride, 12.5 g. (0.025 mole) of 4-phenyl-4-carboethoxy-piperidine carbonate, 10.5 g. (0.125 mole) sodium bicarbonate, and 100 cc. of anhydrous ethanol are mixed, stirred and heated under reflux for a period of approximately 40 hours, and then concentrated in vacuo to dryness. The residual material is triturated with 50 cc. of water, decanted, washed by decantation with an additional 50 cc. of water, and then dried in vacuo to give N-[β-(p-aminophenyl)ethyl]-4-phenyl-4-carboethoxypiperidine.

The N-[β-(p-aminophenyl)ethyl]-4-phenyl-4-carboethoxypiperidine is dissolved in 50 cc. of hot anhydrous ethanol, an excess (about 20 cc.) of 20% alcoholic hydrochloric acid solution is added; upon scratching the side of the container crystals form. One hundred cubic centimeters of ether are then added to the mixture, the ethereal mixture is cooled, and the crystalline material which precipitates is recovered by filtration, washed with ether, and dried to give 12.7 g. of N-[β-(p-aminophenyl)ethyl]-4-phenyl-4-carboethoxypiperidine dihydrochloride which can be further purified by recrystallization from ethanol or methanol to give substantially pure material; M.P. 275–277° C. Calc'd. for $C_{22}H_{28}O_2N_2 \cdot 2HCl$: C, 62.12; H, 7.11; N, 6.59; Cl, 16.67. Found: C, 61.75; H, 6.90; N, 6.48; Cl, 16.60.

The β-(p-aminophenyl)ethyl chloride hydrochloride used as starting material in the foregoing example may be prepared as follows: A mixture of 111 g. acetic anhydride and 66 g. of acetic acid is cooled to 0° C., 69 g. of fuming nitric acid is added slowly, and the mixture is cooled to −5° C. To the cold mixture thus obtained is added dropwise with stirring 101 g. β-phenylethyl bromide over a period of about two hours while maintaining the temperature of the mixture between about −10 and 0° C. The nitration mixture is stirred for an additional two–three hours at a temperature below 0° C., and the reaction mixture is poured into a suspension of 145 g. sodium carbonate in 1100 cc. ice water. The yellow product is extracted from the aqueous mixture with benzene, the benzene extract is washed with excess sodium bicarbonate solution, then with water, and then dried over magnesium sulfate. The benzene is evaporated from the resulting solution in vacuo, and the residual material is crystallized from petroleum ether to give about 55 g. of β-(p-nitrophenyl)ethyl bromide; M.P. 65–67° C. To a solution containing 172 g. stannous chloride in 430 cc. concentrated aqueous hydrochloric acid is added portionwise with shaking 43 g. of β-(p-nitrophenyl)ethyl bromide over a period of about 45 minutes. The resulting mixture is warmed for an additional 45 minutes on a steam bath, and the aqueous solution is decanted from some oily material. The resulting solution is cooled, 750 cc. of a 30% aqueous sodium hydroxide solution is added, and the resulting cold aqueous alkaline solution is extracted with 400 cc. of ether and then with two 200 cc. portions of ether. The combined ether extracts are washed with two 300 cc. portions of water and the washer ether solution is shaken with 95 cc. of 3.5 N aqueous hydrochloric acid solution whereupon crystallization takes place immediately. The crystalline slurry is cooled to about 0° C., allowed to stand to complete crystallization, the slurry is filtered, and the crystals are washed with three 25 cc. portions of ice water and dried in vacuo to give about 30 g. of a mixture of β-(p-aminophenyl)ethyl bromide hydrochloride and β-(p-aminophenyl)ethyl chloride hydrochloride.

*Example 2*

One gram of N-[β-(p-aminophenyl)ethyl]-4-phenyl-4-carboethoxypiperidine dihydrochloride prepared as described in Example 1 hereinabove is dissolved in 25 cc. of water, excess sodium hydroxide solution is added, and the aqueous alkaline mixture is extracted with two 50 cc.-portions of ether. The ether extracts are combined, dried over magnesium sulfate, and evaporated to dryness in vacuo to give N-[β-(p-aminophenyl)ethyl]-4-phenyl-4-carboethoxypiperidine base. This material is mixed with 2 cc. glacial acetic acid and 2 cc. of acetic anhydride, and the resulting mixture is heated on the steam bath for a period of about one hour, and then allowed to stand overnight at room temperature. The reaction mixture is diluted with 25 cc. of water, an excess of sodium bicarbonate is added portionwise whereupon a gummy precipitate forms. The aqueous layer is decanted from this precipitate and the latter is washed by decantation with three 15 cc.-portions of water, and dried in vacuo to give N-[β - (p-acetylaminophenyl)ethyl] - 4 - phenyl-4-carboethoxypiperidine base.

The N-[β-(p-acetylaminophenyl)ethyl] - 4 - phenyl-4-carboethoxypiperidine base is dissolved in 10 cc. of anhydrous ethanol, a trace of salt which forms is removed by filtration and to the filtered solution is added an excess (2 cc.) of 20% alcoholic hydrochloric acid solution. Crystallization occurs immediately, the crystalline slurry is cooled to 0° C. and filtered, and the crystalline material is washed with four 3 cc.-portions of cold anhydrous ethanol and dried to give about 0.5 g. of N-[β-(p-acetylaminophenyl)ethyl] - 4 - phenyl-4-carboethoxypiperidine hydrochloride; M.P. 264–265° C.; Calc'd. for $C_{24}H_{30}O_3N_2 \cdot HCl$: C, 66.88; H, 7.25; N, 6.50. Found: C, 67.18; H, 7.57; N, 6.39.

*Example 3*

To a solution of 1.8 g. (0.005 mole) of purified N-[β - (p-aminophenyl)ethyl] - 4 - phenyl-4-carboethoxypiperidine in 10 cc. of anhydrous ethanol is added 8.2 cc. of 2.23% ethanolic hydrogen chloride (0.005 mole). The mixture is chilled at about 0° C. overnight. The crystals of N-[β-(p-aminophenyl)ethyl]-4-phenyl-4-carboethoxypiperidine monohydrochloride thus obtained are filtered, washed with 3 cc. portions of ice-cold anhydrous ethanol and dried. 1.0 g. of product is obtained, M.P. 218–220° C. Calc'd for $C_{22}H_{28}O_2N_2 \cdot HCl$: C, 67.96; H, 7.54; N, 7.20. Found: C, 67.79; H, 7.23; N, 7.39.

The purified N-[β-(p-aminophenyl)ethyl]-4-phenyl-4-carboethoxypiperidine used as starting material in the foregoing example may be prepared as follows: 5 g. of the pure dihydrochloride salt obtained as described in Example 1 is dissolved in water and treated with an excess of aqueous sodium hydroxide solution. The liberated base is extracted into ethyl ether, and the ether extracts dried over magnesium sulfate. Concentration of ether extracts to dryness in vacuo affords a residue of substantially pure N-[β-(p-aminophenyl)ethyl]-4-phenyl-4-carboethoxypiperidine free base.

The new compounds obtained as described hereinabove have been referred to as substituted piperidines, alternatively they may be considered as derivatives of isonipecotic acid. Thus N - [β-(p-aminophenyl)ethyl]-4-phenyl-4-carboethoxypiperidine may be named as ethyl 1-(4-aminophenylethyl)-4-phenyl isonipecotate.

Various changes and modifications may be made in carrying out the present invention without departing from the spirit and scope thereof. Insofar as these changes and modifications are within the purview of the annexed claims, they are to be considered as part of our invention.

We claim:
1. A compound selected from the group which consists of N - [β-(p-aminophenyl)ethyl]-4-phenyl-4-carboethoxypiperidine having the formula:

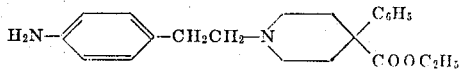

and non-toxic acid addition salts thereof.
2. N - [β - (p-aminophenyl)ethyl]-4-phenyl-4-carboethoxypiperidine dihydrochloride.
3. N - [β - (p - aminophenyl)ethyl]-4-phenyl-4-carboethoxypiperidine monohydrochloride.
4. N - [β - (p - aminophenyl)ethyl]-4-phenyl-4-carboethoxypiperidine having the formula:

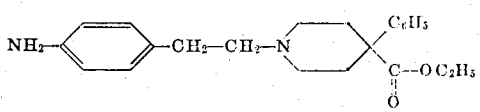

References Cited in the file of this patent
UNITED STATES PATENTS

| 2,167,351 | Eisleb | July 25, 1939 |
|---|---|---|
| 2,486,795 | Kaegi | Nov. 1, 1949 |
| 2,748,140 | Schmidle et al. | May 29, 1956 |
| 2,784,192 | Schmidle et al. | Mar. 5, 1957 |
| 2,794,810 | Cusic | June 4, 1957 |

OTHER REFERENCES

Simons: Industrial and Engineering Chemistry, vol. 39, p. 238 (1947).